(12) United States Patent
Bavard et al.

(10) Patent No.: US 8,729,728 B2
(45) Date of Patent: May 20, 2014

(54) POWER ADJUSTMENT SYSTEM ADAPTED FOR POWERING AN ELECTRIC LINE FOR SUPPLYING POWER TO VEHICLES

(75) Inventors: Xavier Bavard, Bailleulval (FR); Eric Chattot, Meudon (FR); Jean-Noël Verhille, Oignies (FR)

(73) Assignee: Siemens S.A.S., St. Denis (FR)

( * ) Notice: Subject to any disclaimer, the term of this patent is extended or adjusted under 35 U.S.C. 154(b) by 607 days.

(21) Appl. No.: 13/000,239

(22) PCT Filed: Jun. 20, 2008

(86) PCT No.: PCT/FR2008/000870
§ 371 (c)(1),
(2), (4) Date: Dec. 20, 2010

(87) PCT Pub. No.: WO2009/153416
PCT Pub. Date: Dec. 23, 2009

(65) Prior Publication Data
US 2011/0095604 A1    Apr. 28, 2011

(51) Int. Cl.
*B60L 1/00* (2006.01)
*B60L 3/00* (2006.01)
*H02G 3/00* (2006.01)
*H02J 1/08* (2006.01)
*B60L 9/00* (2006.01)
*H02J 3/32* (2006.01)

(52) U.S. Cl.
USPC .................. 307/10.1; 105/49; 191/2; 307/12; 307/48

(58) Field of Classification Search
None
See application file for complete search history.

(56) References Cited

U.S. PATENT DOCUMENTS 5,280,418 A    1/1994 Griffin 6,782,833 B2 *    8/2004 Nightall ........................ 104/298
7,397,149 B2 *    7/2008 Seddiki et al. .................. 307/62

FOREIGN PATENT DOCUMENTS

EP    1359049 A1    11/2003

OTHER PUBLICATIONS

Reiner, et al: "Einsatzmöglichkeiten für Energiespeicher im Elektrischen Bahnbetrieb", XP-000398565, Oct. 1, 1993, pp. 331-335, vol. 91, No. 10, München, Germany.—Statement of Relevance.

* cited by examiner

*Primary Examiner* — Jared Fureman
*Assistant Examiner* — Aqeel Bukhari
(74) *Attorney, Agent, or Firm* — Laurence A. Greenberg; Werner H. Stemer; Ralph E. Locher

(57) ABSTRACT

The invention relates to a power adjustment system adapted for powering an electric line for supplying power to vehicles moving in a traffic lane combined with said electric line that comprises an electric supply feeder (AD) delivering an average electric power directly or via at least one converter to the electric line, and an adjustable power based on power fluctuation and required for an instantaneous traffic intensity to an energy storage means (MS) capable of powering the electric line at a peak power via at least one other converter, characterised in that a dimensioning unit (PCC) receives information on the power needs based on the traffic intensity evaluated over at least one duration of said traffic, and in that the dimensioning unit uses information for controlling an adjustment of the useful predictable storage of the storage means so that the electric power (P_IN0, P_IN1) delivered to the storage means is adjusted and minimal while exactly maintaining a sufficient energy backup in the storage means for compensating for any peak power (P_INST) instantaneously required by the traffic in the given duration.

8 Claims, 2 Drawing Sheets

POWER ADJUSTMENT SYSTEM ADAPTED FOR POWERING AN ELECTRIC LINE FOR SUPPLYING POWER TO VEHICLES

BACKGROUND OF THE INVENTION

Field of the Invention

The present invention relates to a power adjustment system for powering an electric line for supplying power to vehicles according to the preamble to claim 1.

In terms of vehicles, reference is made in particular to public transport, as in the context of a railroad line, a metro, bus or trolleybus line or any other group of vehicles moving on a predetermined track/route on which there is disposed at least one energy supply point for providing the power required by the vehicles.

In a known manner and by way of example, such systems for supplying metro line traction power are subject to power fluctuations depending primarily on the number of vehicles on-line and their phase synchronism. The power consumption, which increases with the number of vehicles and their frequency, is not constant and varies markedly as a function of the synchronism of the traction phases (acceleration, constant speed, braking) of the vehicles. These rapid power variations produce significant power peaks which have to be met. Said power peaks necessitate overdesigning of the power distribution systems, and in many cases result in contractual penalties with the energy supplier.

These aspects must be particularly taken into consideration in a power adjustment system for powering an electric line for supplying power for vehicles moving on a track/traffic route associated with said electric line, thus comprising an electric supply feeder delivering electric power to an energy storage means capable of supplying the electric line as a function of fluctuations in the energy required for an (instantaneous) traffic density. The storage means is generally connected to catenaries (overhead wires) or to at least one conductor rail. In general, the supply feeder of an energy supplier consists of a power input selected such that peak power requirements shall be perfectly met in even the densest traffic scenarios. In the context of the present invention, there is disposed between the supply feeder and the storage means a rectifier station comprising, among other things, transformer/rectifier/circuit breaker/cable units in order to adequately distribute the supplied power as output power, also known as "power demand" for each track/traffic route supplied by said storage means.

The design rating (dimensioning) of such an installation/electric supply feeder of e.g. a metro line is calculated for the maximum capacity (number of vehicles) permitted by the metro line operation in all operating modes (rush hour and off-peak). The design rating of the installations therefore allows for the power peaks in order to ensure the availability and reliability of the system. As regards the contractual agreement with the energy supplier, two cases exist:

1) a service contract with the supplier is voluntarily oversized (and therefore more expensive) in order to ensure an adequate supply of energy in all situations;
2) a service contract with the supplier is selected right-sized, but if more power is drawn (for various reasons, high traffic frequency, engineering works, maintenance, equipment upgrading, etc.), penalties are inevitable. In the worst case, action such as speed or traffic density reduction must be taken in order to limit the power consumption required on the route in order not to place extra demand on the power supply equipment. This is quite obviously not to the passengers' satisfaction and even less to that of the operator.

These contractual constraints, because of the performance obligations associated with current technology, constitute a difficult dilemma to be resolved.

BRIEF SUMMARY OF THE INVENTION

An object of the present invention is to propose a power adjustment system for powering an electric line for supplying power to vehicles moving on a track/traffic route associated with said electric line, for which the design rating of the supply feeder shall be better matched to the requirements of the line.

Based on a power adjustment system for powering an electric line for supplying power for vehicles moving on a track/traffic route associated with said electric line, comprising an electric supply feeder delivering an average electric power directly to the electric line or via at least one converter, and an adjustable power as a function of (instantaneous) fluctuations in the energy required for an instantaneous traffic density to an energy storage means capable of supplying the electric line with peak power via at least one other converter, the system thus provides that a dimensioning unit (traffic monitoring point) receives information concerning energy requirements as a function of the traffic density evaluated over at least one duration (hourly, for example) of said traffic, by means of the information, the dimensioning unit controls an adjustment of the useful predicted storage of the storage means such that the electric power supplied to the storage means (linked to the power set by the supplier) shall be adjusted to a minimum threshold while ensuring as precisely as possible a sufficient energy backup in the storage means to compensate for any peak power required instantaneously by the traffic in the given time duration.

In other terms, the large power deviations due to the peaks over a chosen time period are directly absorbed by the storage means as an adjusted and minimized supply input (supplier side) and variable output power (user side) backup indicative of said severely fluctuating deviations. Thus, excessive power consumption as well as "overdimensioning" of the power provided by the supplier are advantageously prevented.

The invention provides that the storage means is either inertial or electrical by means of at least one battery or at least one supercapacitor. A supercapacitor offers the particular advantage of high capacitance allowing a heavy charge of both limited and continuous duration and that, similarly, it can discharge to the line over a limited time period, e.g. in the event of heavy instantaneous energy requirements.

The storage means can be disposed at ground level as an energy reservoir in a station, itself disposed alongside the track. This is important when a vehicle has an on-board energy storage means requiring a main charging phase in the station (particularly in the case of overhead wire or conductor rail discontinuity outside the station).

In this regard, the storage means can also be distributed over a plurality of substations disposed along the track. A supply feeder can also be associated with each substation according to the invention, thereby considerably reducing large dimensioning of the centralized supply feeder supplying several substations.

For storage adjustment purposes, the storage means comprises a storage control unit connected to a transceiver-type module communicating (in a wireline or wireless manner) with the power adjustment unit for supplying an electric supply line.

Concurrently, the information received by the adjustment unit includes the traffic density on the track/route in terms of time intervals between the vehicles, number of vehicles and power requirements ancillary to the movement of vehicles, such as for active amenity or safety equipment. This information is basically known by the traffic controllers and can therefore be easily implemented in order to flexibly define the adjustment of the storage means over a time duration and thus the real and exact requirement in terms of power supplied by the supply/distribution feeder (supplier side).

To this effect, a set of sub-claims also sets out the advantages of the invention.

A typical implementation and application will now be described with reference to the accompanying drawings

BRIEF DESCRIPTION OF THE SEVERAL VIEWS OF THE DRAWING

FIG. 1 shows a power adjustment system according to the invention for supplying an electric supply line COND (such as overhead wires or a conductor rail) with instantaneous power P_INST (or referred to as peak) for vehicles V moving on a track/traffic route associated with said electric line.

DESCRIPTION OF THE INVENTION

The system comprises
an electric supply feeder AD delivering an electric power P_IN0 to a rectifier CONY. Said rectifier supplies an electric power P_IN1 to an energy storage means MS and an electric power P_MOY (=P_IN0-P_IN1) to the electric line COND. These powers can be supplied simultaneously as a function of fluctuations in energy required for an instantaneous traffic density, the power P_IN0 thus provided is within a "supplier" power range [P0; Pmax] which according to the invention shall be adjusted to a minimum threshold in constant voltage increments as a function of the time interval int to be maintained between the vehicles, the electric power P_IN1 delivered by the supplier to the storage means is limited such that said power corresponds to the maximum average power P_MOY to be supplied for a given traffic and that the peak power P_INST associated with that same traffic is supplied by the storage means MS, the storage means MS is recharged with a power P_IN1 when the power demand goes below the power threshold P_MOY corresponding to a fall in the energy demand by the vehicles, a dimensioning unit PCC receiving information INF1 concerning the energy requirements of the traffic density evaluated over at least one duration of said traffic, by means of the information INF1, the dimensioning unit controls, by means of associated information INF2, an adjustment CTRL of the useful predicted storage of the storage means MS such that the electric power P_IN0 supplied to the storage means shall be adjusted to a minimum threshold while precisely ensuring a sufficient energy backup in the storage means to compensate for any peak power P_INST (and if necessary, severe fluctuations thereof) required by the traffic in the given time period. In particular, the electric power P_IN0 from the supplier and P_IN1 delivered to the storage means is calculated as a function F(int) of the time interval int between the vehicles on the track/route.

Figure 1:
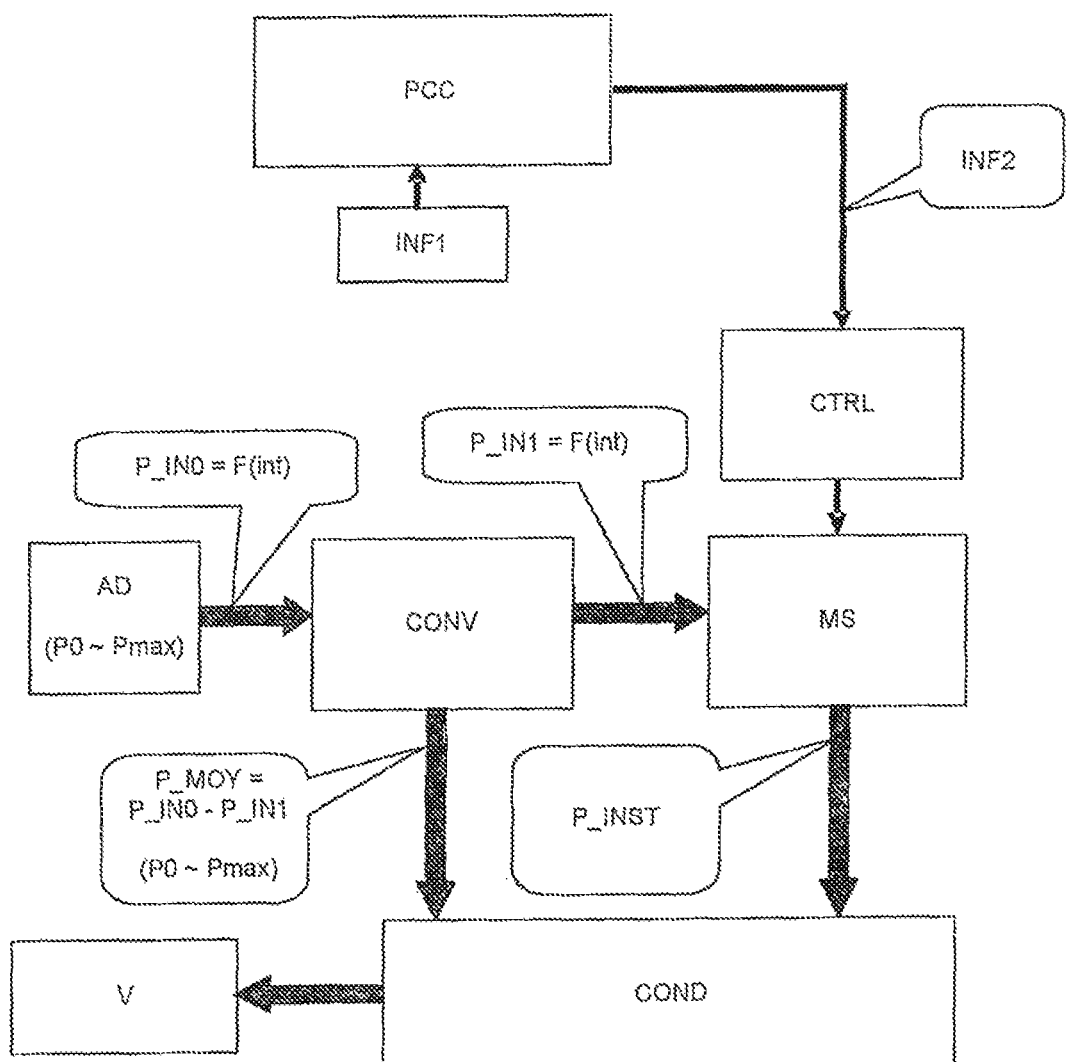
FIG. 1 schematically illustrates a power adjustment system according to the invention for powering an electric line for supplying power for vehicles, FIG. 2 schematically illustrates said system with in-station storage means.

FIG. 1 also shows an e.g. rectifying power converter CONV between an output of the supply feeder AD (supplier side) and an input of the storage means MS, allowing conversion between the adjusted and minimum input powers P_IN0 and output powers P_IN1 of the converter CONV. This same rectifier module CONV can provide a direct link between the supply feeder AD and the electric line COND (conventional arrangement without storage means). Other rectifying devices e.g. between the storage means MS and the electric line are not shown in FIG. 1 for reasons of clarity.

Figure 2:
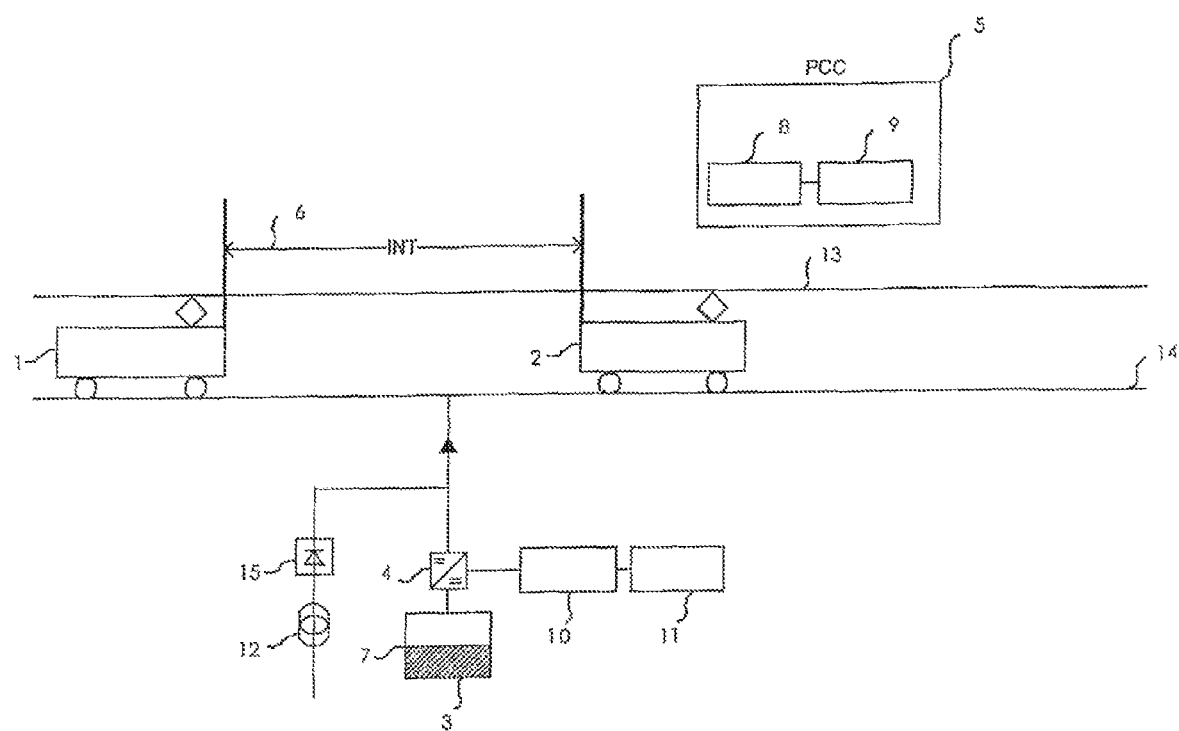

FIG. 2 shows a diagram of said system according to FIG. 1 with, as a storage means, a supercapacitor 3 disposed in a station or substation (platform) and having an adjustable energy level 7. The storage means is supplied with energy at adjusted and minimum power and is then discharged to the electric line, here a catenary 13 or a conductor rail 14 in contact with the motor power supplies of the vehicles 1, 2, in order to deliver the precise peak power level required by the vehicles. Depending on the size of the time interval 6, INT between the vehicles 1,2, it is possible to make the required power to the storage means MS vary precisely while remaining at an acceptable "supplier" power over a predefined (not overdimensioned) duration. The storage means thus comprises a supercapacitor 3 whose energy is stored in a constant manner under adjusted and minimum power in constant power increments as a function of the interval INT by means of a rectification circuit (converter 4/chopper) and can be resupplied simultaneously to the electric line 13, 14 at an instantaneous peak power required by the vehicles 1,2. In principle, the converter 4 is a means of adjusting the charge of the supercapacitor 3 as a function of the time interval INT between the vehicles 1, 2. In practice, the longer the time interval, the more the time required to charge the supercapacitor 3 can be reduced, thereby more generally reducing any power spike. The adjustment of the instantaneous peak power is implemented by means of a current circuit 12 and an additional rectifier 15 for the energy supplied at the output of the supercapacitor 3, which means that minimum and constant power is provided by the supply feeder.

The storage means comprises an energy storage and discharge control unit 10 coupled to a transceiver-type module 11 in communication with the dimensioning unit PCC (centralized control point). Thus the power supplied to the storage means will be periodically matched to a constant and low level while ensuring that the instantaneous discharge power variations will be compensated.

In order to facilitate communication between the centralized control point 5, PCC and the storage and discharge control unit 10 for the energy supplied successively at "supplier" power, stored in the storage means, then resupplied to the electric line, the centralized control point PCC comprises, in addition to a dimensioning unit 8 for monitoring the in-station control unit 10, a transmitter/receiver communicating with the transceiver-type module 11 of the storage means MS. In this way, it is inventively possible to centrally modify energy adjustment parameters over a desired duration (off-peak/rush hour traffic) at the level of each station.

The invention claimed is:

1. A power adjustment system for powering an electric line for supplying power for vehicles moving on a track/traffic route associated with the electric line, comprising:
an electric supply feeder delivering an electric power to the electric line and delivering an adjustable power as a function of fluctuations in an energy required for an instantaneous traffic density to an energy storage device for supplying the electric line with peak power through at least one converter;

a dimensioning unit receiving information concerning energy requirements as a function of the traffic density evaluated over at least one given time duration;

said dimensioning unit, based on the information, controlling an adjustment of a useful predicted storage of said storage device such that the electric power supplied to said storage device is adjusted to a minimum threshold while precisely ensuring a sufficient energy backup in said storage device to compensate for any peak power required instantaneously by the traffic in the given time duration.

2. The system according to claim 1, wherein the said electric supply feeder is connected to deliver the electric power directly to the electric line or via at least one converter.

3. The system according to claim 1, wherein said storage device is an inertial storage device or an electrical storage device formed with at least one battery or at least one supercapacitor.

4. The system according to claim 1, wherein said storage device is disposed in a station disposed alongside the track.

5. The system according to claim 1, wherein said storage device is disposed and distributed over a plurality of substations disposed along the track.

6. The system according to claim 1, wherein said storage device comprises an energy storage and discharge control unit coupled to a transceiver-type module in communication with said dimensioning unit.

7. The system according to claim 1, wherein the information received by said dimensioning unit comprises the traffic density on the track/route in terms of a time interval between the vehicles, number of vehicles, and energy requirement ancillary to a movement of the vehicles.

8. The system according to claim 7, wherein the information ancillary to the movement of the vehicles includes the energy requirement of active amenity or safety equipment.

* * * * *